United States Patent
Wild

(10) Patent No.: US 6,546,789 B1
(45) Date of Patent: Apr. 15, 2003

(54) METHOD AND ARRANGEMENT FOR MONITORING THE OPERATION OF AN INTAKE-MANIFOLD FLAP FOR SWITCHING OVER THE INTAKE MANIFOLD OF AN INTERNAL COMBUSTION ENGINE

(75) Inventor: Ernst Wild, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/708,539

(22) Filed: Nov. 9, 2000

Related U.S. Application Data

(63) Continuation-in-part of application No. 09/107,132, filed on Jun. 30, 1998, now abandoned.

(30) Foreign Application Priority Data

Jun. 30, 1997 (DE) .......................................... 197 27 669

(51) Int. Cl.[7] ............................................. G01M 15/00
(52) U.S. Cl. ...................................................... 73/118.1
(58) Field of Search ........................ 73/117.3, 40, 115, 73/118.1, 112, 116, 117.2, 118.2; 123/32 EA, 417

(56) References Cited

U.S. PATENT DOCUMENTS

| | | |
|---|---|---|
| 3,880,125 A | 4/1975 | Kammerer et al. ..... 123/32 EA |
| 4,582,031 A | 4/1986 | Janetzke et al. |
| 4,762,105 A | 8/1988 | Beyer et al. ................. 123/417 |
| 5,249,459 A | 10/1993 | Becker |
| 5,635,634 A | 6/1997 | Reuschenbach et al. ... 73/118.2 |

FOREIGN PATENT DOCUMENTS

| | | |
|---|---|---|
| DE | 3608310 | 9/1987 |

*Primary Examiner*—Eric S. McCall
(74) *Attorney, Agent, or Firm*—Walter Ottesen

(57) ABSTRACT

The invention is directed to a method for monitoring the operation of an intake-manifold flap for switching the intake manifold of an internal combustion engine. The engine rpm (nmot) is measured utilizing an rpm sensor and the air mass flow (ms) is measured utilizing an air mass flow sensor. The intake manifold pressure (ps) is computed on the basis of the engine rpm (nmot) and the air mass flow (ms) for at least two different intake-manifold flap positions and, simultaneously, the intake-manifold pressure is measured utilizing a pressure-detecting sensor. The difference between the computed and measured intake-manifold pressures is formed for each one of at least two positions of the manifold flap. A diagnosis is then made of the operation of the intake-manifold flap by evaluating the differences formed.

7 Claims, 3 Drawing Sheets

METHOD AND ARRANGEMENT FOR MONITORING THE OPERATION OF AN INTAKE-MANIFOLD FLAP FOR SWITCHING OVER THE INTAKE MANIFOLD OF AN INTERNAL COMBUSTION ENGINE

RELATED APPLICATION

This application is a continuation-in-part application of patent application Ser. No. 09/107,132, filed Jun. 30, 1998 now abandoned, and entitled "Method for Monitoring the Operation of an Intake-Manifold Flap for Switching over the Intake Manifold of an Internal Combustion Engine".

FIELD OF THE INVENTION

The invention relates to a method for monitoring the operation on the intake-manifold flap for switching over the intake manifold in an internal combustion engine.

BACKGROUND OF THE INVENTION

In specific rpm ranges, resonances of the air column occur in the intake manifold of an engine which can be used for an improved air charge of the cylinder. To achieve this effect in other rpm ranges, it has been long known to change the length of the intake manifold by switching over an intake-manifold flap mounted in the intake manifold. At other rpms, resonances occur in the air column in the intake pipe by changing the length of the intake manifold and can be used at these rpms to improve the air charge to the cylinders.

It is known to change the geometry of the intake manifold to achieve optimal low speed torque and high rated output at maximum engine speed. In this connection, reference can be made to the text entitled "Automotive Handbook" published by Robert Bosch GmbH, pages 476 and 477 (1996). An arrangement for continuously changing the length of an air-intake manifold of an internal combustion engine is also disclosed in German patent publication 3,608,310 (corresponding to U.S. patent application Ser. No. 07/025,548, filed Mar. 13, 1987, now abandoned). A diagnostic procedure for diagnosing the function and effect of variations of the intake manifold and the intake manifold track geometry is disclosed in U.S. Pat. No. 5,249,459, incorporated herein by reference.

The configuration and the control of an internal combustion engine having an intake-manifold switchover require an operational intake-manifold flap for switching over the intake manifold. For this reason, the limit values of the exhaust gas emission can be exceeded when there are disturbances in the operation of the intake-manifold flap.

Regulations of the California environmental authority (CARB) as well as United States federal regulations require monitoring all exhaust-gas relevant functions of a motor vehicle utilizing on-board diagnosis (OBD). The operation of the intake-manifold flap affects the exhaust gas emission values. Accordingly, it is necessary to monitor the function of the intake-manifold flap because of these regulations.

In known methods for monitoring the operation of the intake-manifold flap for switching over the intake manifold, only the output stage in a control apparatus has been monitored to date. This output stage effects the switchover of the intake-manifold flap. With this indirect monitoring, however, conclusions cannot be drawn directly as to a proper operation of the intake-manifold flap because the operation of the intake-manifold flap is not directly monitored.

SUMMARY OF THE INVENTION

It is an object of the invention to provide a method for monitoring the operation of intake-manifold flap for switching over the intake manifold of an internal combustion engine wherein a direct monitoring of the operation of the intake-manifold flap is made possible with the simplest possible technical means.

The method of the invention is for monitoring the operation of an intake-manifold flap of an intake manifold of an internal combustion engine. The intake manifold is provided to conduct an air mass flow (ms) to the cylinders of the engine and is arranged between an air intake pipe holding a throttle flap and the inlet valves of the cylinders, wherein a change of intake manifold flap position changes the resonance characteristics of the intake manifold to achieve optimal low speed torque and high rated output at maximum engine speed and the engine having an engine rpm (nmot) when running. The method includes the steps of: measuring the engine rpm (nmot) utilizing an rpm sensor; measuring the air mass flow (ms) utilizing an air mass flow sensor; computing the intake manifold pressure (ps) based on the engine rpm (nmot) and the air mass flow (ms) for at least two different intake-manifold flap positions corresponding to respectively different geometries of the intake manifold and, simultaneously, measuring the intake-manifold pressure utilizing pressure-detecting means; forming a difference between the computed and measured intake-manifold pressures for each one of at least two positions of the manifold flap; and, making a diagnosis of the operation of the intake-manifold flap by evaluating the differences formed.

A monitoring of the operation of the intake-manifold flap position for switching over the intake manifold is made possible in an especially advantageous manner by the comparison of the computed intake-manifold pressure and the measured intake-manifold pressure in dependence upon the position of the intake-manifold flap. The switchover of the intake manifold must be assumed to be defective when, during a switchover of the intake-manifold flap, in a range, in which the pressure during switchover should change significantly, a deviation of the measured pressure from the computed pressure is determined. Monitoring the operation of the position of the intake-manifold flap is possible in an especially advantageous manner by continuously monitoring the measured pressure with the aid of the computed pressure in dependence upon the position of the intake-manifold flap.

This monitoring can, for example, advantageously take place in that the differences of the computed and the measured intake-manifold pressures at different positions of the intake-manifold flap are each subtracted from each other, compared to a pregiven limit value and, when this limit value is exceeded, a fault signal is outputted.

The computation of the pressure from the air mass flow and the rpm takes place advantageously in dependence upon the intake-manifold dynamic and the position of the intake-manifold flap.

The intake-manifold dynamic considers also the following: the intake-manifold geometry as well as the position of the throttle flap, the stroke volume, the compression ratio and the degree of charge of the engine.

In an advantageous manner, factors are determined which are dependent upon the geometry of the intake manifold. These factors are determined to compute the intake-manifold pressure in dependence upon the position of the intake-manifold flap and are stored in a characteristic field.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
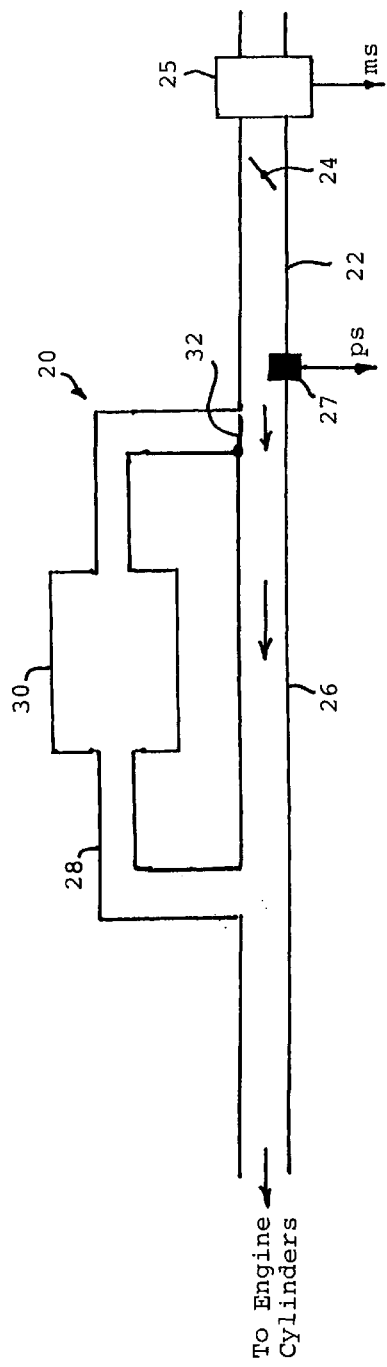
FIGS. 1A and 1B are schematic views of an intake manifold having an intake-manifold flap shown in respective positions.

FIG. 1A schematically shows an intake manifold 20 arranged between the air intake pipe 22 and the cylinders (not shown) of the engine. A throttle flap 24 is mounted in the air intake pipe 22. The intake manifold 20 includes a first channel 26 and a second channel 28 incorporating a plenum 30. Thus, channels 26 and 28 have different geometries. An intake manifold flap 32 can be moved between the position shown in FIG. 1A wherein the air flow to the cylinders is through the first channel 26 and a second position shown in FIG. 1B wherein the air flow through the intake manifold is through the second channel 28. The intake manifold flap 32 can be moved to various positions between those shown in FIGS. 1A and 1B to further vary the geometry encountered by the air flow as it moves from the air intake pipe 22 to the cylinders.

Figure 1B:
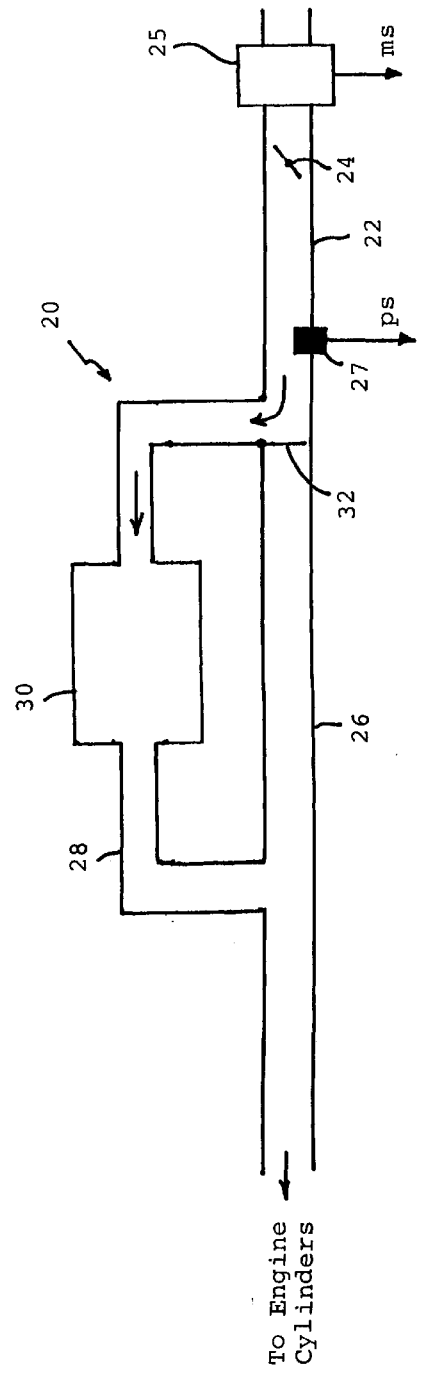

In FIGS. 1A and 1B, an air mass sensor 25 is mounted upstream of the throttle flap 24 and an intake manifold pressure sensor 27 is mounted in the intake manifold forward of the intake-manifold flap 32.

By changing the position of the intake manifold flap 32, the resonance characteristics of the intake manifold 20 can be varied. This resonance characteristic comes about because the engine draws air by suction from the intake manifold into the cylinders when the inlet valve of a cylinder is opened. This inflow is interrupted by the closure of the inlet valve of the cylinder. After the inlet valve of the cylinder is closed, the air in the intake manifold continues to move at first farther against the closed inlet valve. In this way, a temporary pressure increase develops forward of the inlet valve which attempts to compensate itself via a backflow. Because the inlet valve opens and closes periodically, an oscillating air column forms in the intake manifold 20. The phase position of this forced oscillation is displaced relative to the periodic opening and closing of the inlet valve.

At specific engine rpms, the maximum pressure occurs because of the phase displacement when the inlet valve is open. In this case of resonance, a comparatively large amount of air flows into the cylinder and thereby improves the charge and therefore the torque supplied by the engine.

The engine rpm which occurs at this resonance is dependent upon the geometry of the intake manifold 20. The switchover between two intake manifold geometries effects an occurrence of a first resonance for a first geometry at a low engine speed and an occurrence of a second resonance for a second geometry at a higher engine speed.

Figure 2:
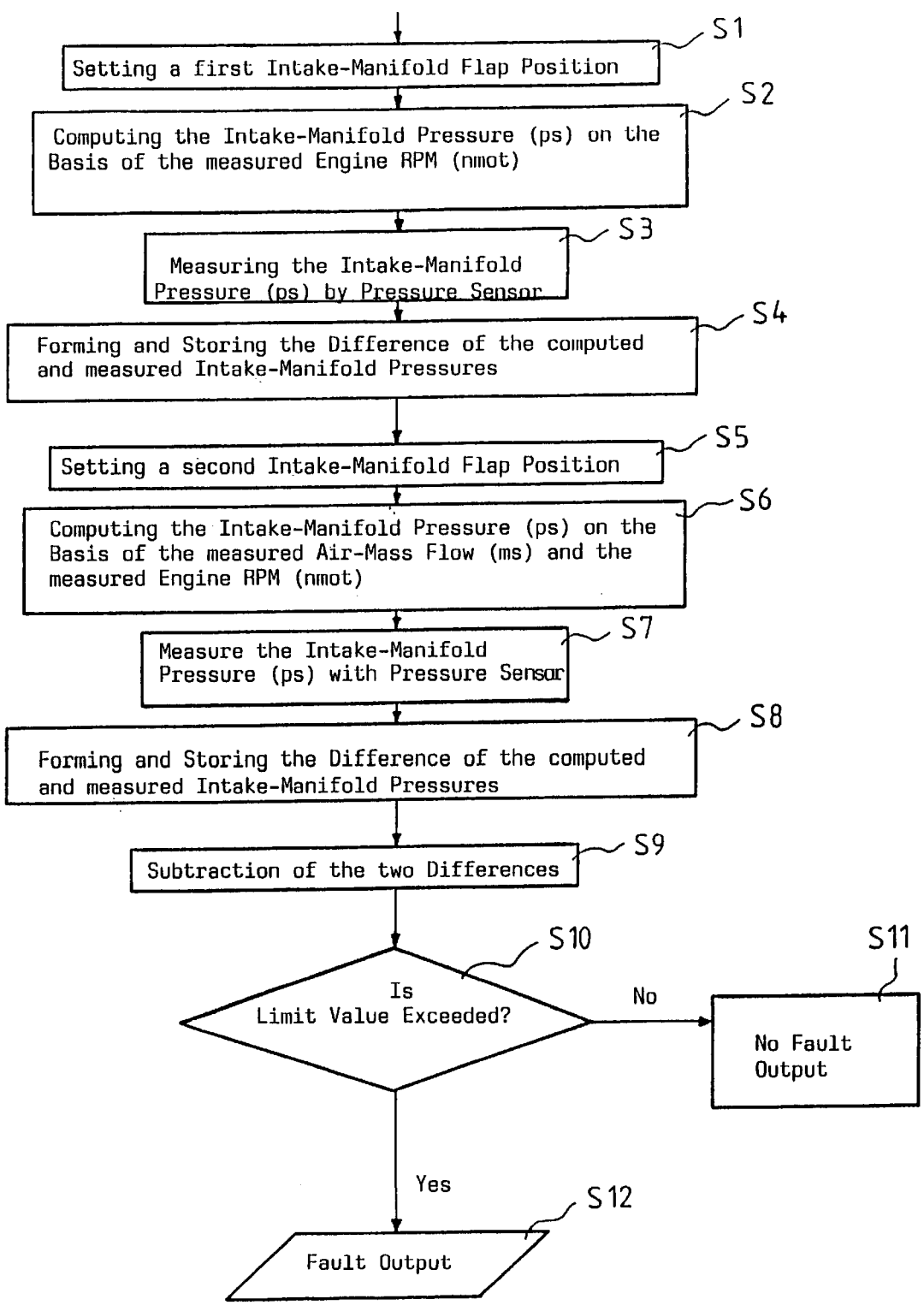
FIG. 2 is a flowchart showing the method of the invention for monitoring the operation of the intake-manifold flap for switching over the intake manifold of an internal engine; and, FIG. 3 is a schematic block circuit diagram for computing the intake-manifold pressure on the basis of the detected air mass flow and the detected rpm of the engine.

The method for monitoring the operation of the intake-manifold flap for switching over the intake manifold of an internal combustion engine is explained with respect to the flowchart of FIG. 2.

A first intake-manifold flap position is set in a first step S1.

Thereafter, the computation of the intake-manifold pressure ps is made on the basis of the air mass flow ms and the engine rpm nmot (step S2). The air mass flow ms is measured by means for detecting the air mass flow (for example, air mass sensor 25) and the rpm of the engine is detected by rpm sensor means.

The intake-manifold pressure ps is measured in step S3 with the pressure sensor 27.

In step S4, the difference of the computed and of the measured intake-manifold pressure ps is formed and stored.

A second intake-manifold flap position is set in step S5, that is, the switchover of the intake manifold is effected.

Thereafter, the intake manifold pressure ps is computed on the basis of the measured air mass flow ms and the measured engine rpm nmot in step S6.

In step S7, the intake manifold pressure ps is measured by the pressure sensor 27 and the difference between the computed and measured intake manifold pressure ps is formed and stored.

The two stored differences are subtracted from each other in step S9 and a determination is made in step S10 as to whether a pregiven limit value is exceeded. If this is the case, then, in step S12, a fault is emitted. If this is not the case, no fault output takes place (step S11).

In this way, a diagnosis of the intake-manifold flap position or the resonance flap position is made possible with a system having an air mass sensor such as a hot-film air mass sensor. For this purpose, only an additional intake manifold pressure sensor is needed to measure the intake manifold pressure ps which, however, is already present in several engine controls so that possibly no additional sensor is required.

Figure 3:
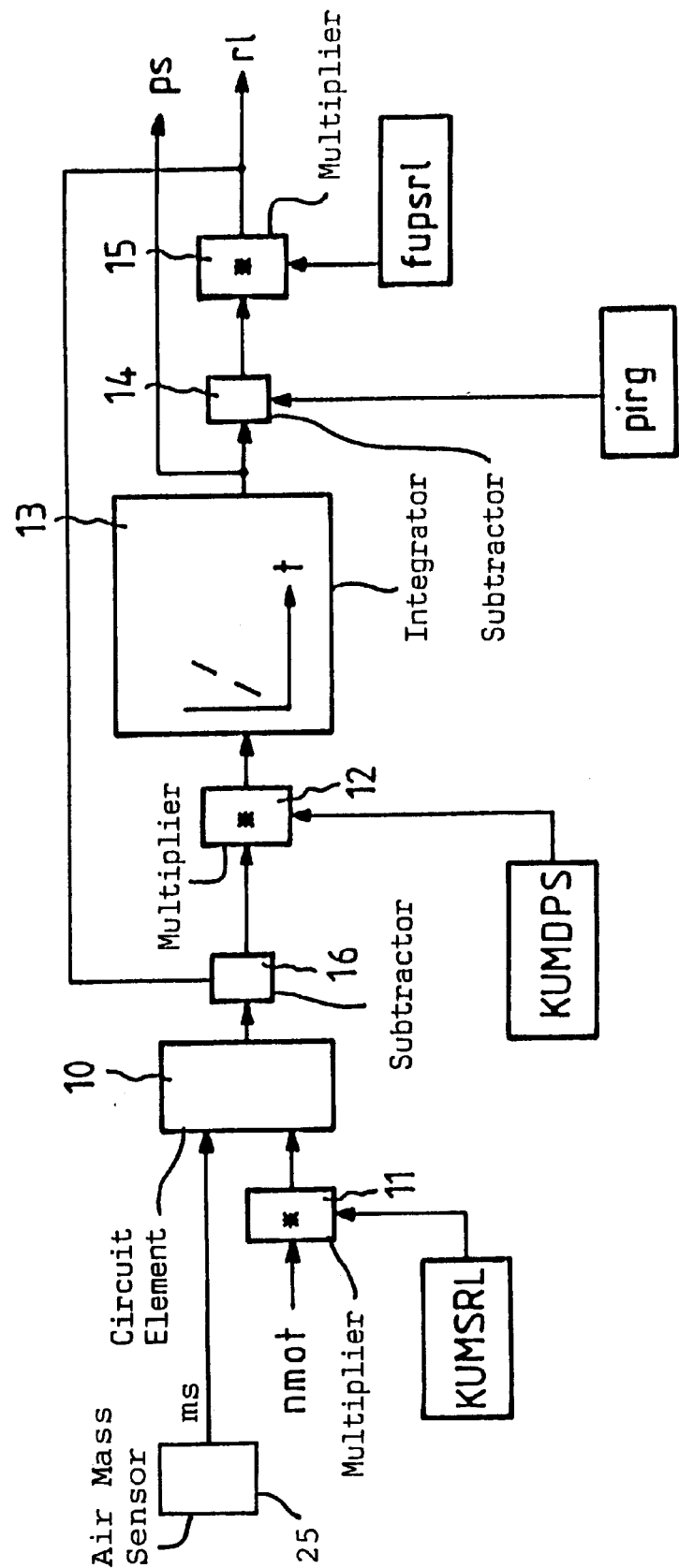

The computation of the intake manifold pressure ps takes place in a manner known per se as described in U.S. Pat. No. 4,582,031, which is incorporated herein by reference and as will be explained with reference to FIG. 3.

In circuit unit 10, the quotient is formed of the air mass flow, which is measured by a hot-film air mass sensor 25, and the engine rpm nmot, which is multiplied by a constant KUMSRL in a circuit unit 11. From this, the relative air charge flowing to the intake manifold of the engine results. In circuit part 12, the relative air charge is multiplied by a constant KUMDPS for conversion into a pressure difference and is then supplied to a time integrator or a time summer 13.

The signal, which is outputted by circuit unit 13, corresponds to the intake-manifold pressure ps and is the computed intake-manifold pressure ps (steps S2 and S6). The partial pressure pirg, which is caused by an internal residual gas, is subtracted from the intake-manifold pressure ps in a circuit element 14. The difference is multiplied in a circuit element 15 by a factor fupsrl to convert the pressure into a relative air charge. The result is then the relative air charge rl of the intake manifold. This relative air charge rl is supplied to a subtractor 16 which is arranged forward of the multiplier 12. With the multiplier 12, the difference between the air mass flowing to the intake manifold and the air mass flowing away from the manifold is formed in a manner known per se as explained in U.S. Pat. No. 4,582,031, incorporated herein by reference.

The intake-manifold pressure ps is determined in dependence upon the intake pipe dynamic, especially the position of the intake manifold flap. The factors fupsrl and pirg are dependent upon the flap position of the intake manifold and are experimentally determined and stored in a characteristic field. The computation of the relative air charge and therefore the intake manifold pressure ps takes place in dependence upon the position of the intake manifold flap.

It is understood that the foregoing description is that of the preferred embodiments of the invention and that various changes and modifications may be made thereto without departing from the spirit and scope of the invention as defined in the appended claims.

What is claimed is:

1. A method for monitoring the operation of an intake-manifold flap of an intake manifold of an internal combustion engine, the intake manifold accommodating said intake-manifold flap therein and being provided to conduct an air mass flow (ms) to the cylinders of said engine and being arranged between an air intake pipe holding a throttle flap and the inlet valves of said cylinders, wherein a change of intake manifold flap position changes the resonance characteristics of the intake manifold to achieve optimal low speed torque and high rated output at maximum engine speed and the engine having an engine rpm (nmot) when running, the method comprising the steps of:

measuring the engine rpm (nmot) utilizing an rpm sensor;

measuring the air mass flow (ms) utilizing an air mass flow sensor;

computing the intake manifold pressure (ps) based on said engine rpm (nmot) and said air mass flow (ms) for at least two different intake-manifold flap positions corresponding to respectively different geometries of said intake manifold and respectively different ones of said resonance characteristics and, simultaneously, measuring said intake-manifold pressure utilizing pressure-detecting means;

forming a difference between the computed and measured intake-manifold pressures for each one of said at least two different positions of said intake-manifold flap; and, making a diagnosis of the operation of said intake-manifold flap by evaluating the differences formed.

2. The method of claim 1, comprising the further steps of:

subtracting said differences from each other and comparing to a pregiven limit value; and, outputting a fault signal when said limit value is exceeded.

3. The method of claim 1, wherein the computation of said intake-manifold pressure (ps) from said air mass flow (ms) and said engine rpm (nmot) is made in dependence upon a position of said intake-manifold flap and at least one of the following quantities: the intake manifold geometry corresponding to said position of said intake-manifold flap; the position of said throttle flap, the stroke volume, the compression ratio and the degree of charge of the engine with the intake-manifold geometry dependent factors for said computation of said intake-manifold pressure being stored in a characteristic field in dependence upon the throttle flap position.

4. The method of claim 1, comprising the further steps of:

experimentally determining factors in dependence upon a position of said intake-manifold flap and storing said factors in a characteristic field; and, utilizing said factors to convert the intake-manifold pressure (ps) into a relative air charge and to consider a partial pressure caused by an internal residual gas and superposed on said intake-manifold pressure.

5. The method of claim 1, wherein the intake manifold includes first and second channels having respectively different geometries connecting said air intake pipe to said cylinders; and, wherein the method comprises the further step of moving said intake-manifold flap in said intake manifold for selectively directing the flow of air through said channels to achieve optimal low speed torque and high rated output at maximum engine speed.

6. A method for monitoring the operation of an intake-manifold flap of an intake manifold of an internal combustion engine, the intake manifold accommodating said intake-manifold flap therein and being provided to conduct an air mass flow (ms) to the cylinders of said engine and being arranged between an air intake pipe holding a throttle flap and the inlet valves of said cylinders, wherein a change of intake manifold flap position changes the resonance characteristics of the intake manifold to achieve optimal low speed torque and high rated output at maximum engine speed and the engine having an engine rpm (nmot) when running, the method comprising the steps of:

(a) setting said intake-manifold flap to a first position corresponding to a first one of said resonance characteristics;

(b) measuring the engine rpm (nmot) utilizing an rpm sensor;

(c) measuring the air mass flow (ms) utilizing an air mass flow sensor;

(d) computing the intake-manifold pressure (ps) based on said engine rpm (nmot) and said air mass flow (ms) corresponding to said first position of said intake-manifold flap;

(e) measuring the intake-manifold pressure (ps) utilizing a pressure sensor;

(f) forming and storing the difference of the computed and measured intake-manifold pressures to form a first pressure difference corresponding to said first position of said intake-manifold flap;

(g) setting said intake-manifold flap to a second position corresponding to a second one of said resonance characteristics different from said first one of (said resonance characteristics;

(h) repeating steps (b) to (f) to obtain a stored second pressure difference corresponding to said second position of said intake-manifold flap;

(i) subtracting the first and second pressure differences from each other to determine a difference quantity; and, (j) evaluating said difference quantity to make a diagnosis of the operation of said intake-manifold flap.

7. The method of claim 6, comprising the further steps of:

comparing said difference quantity to a pregiven limit value; and, if said difference quantity exceeds said limit value, then outputting a fault signal.

* * * * *